Sept. 2, 1969  E. FROELICH  3,464,752
BACK SUPPORT

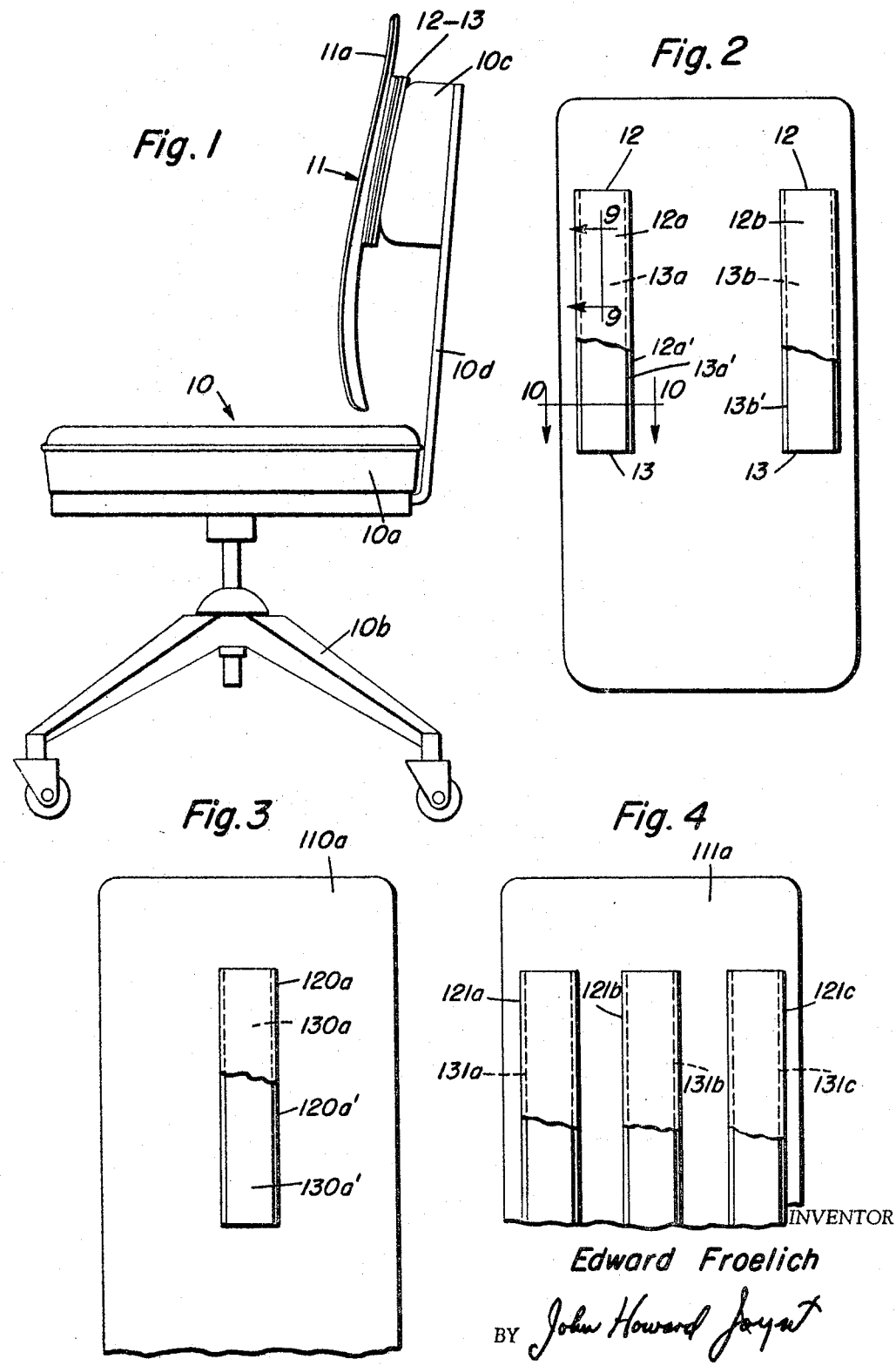

Filed May 22, 1967  2 Sheets-Sheet 2

INVENTOR
Edward Froelich

BY John Howard Joynt

ATTORNEY

United States Patent Office 3,464,752
Patented Sept. 2, 1969

3,464,752
BACK SUPPORT
Edward Froelich, 5408 Eastview Park,
Chicago, Ill. 60615
Filed May 22, 1967, Ser. No. 640,228
Int. Cl. A47c 7/42, 7/46
U.S. Cl. 297—231                     1 Claim

ABSTRACT OF THE DISCLOSURE

A support for the back of an occupant of a chair, a bench, an automobile seat, or the like, which support comprises a rigid and contoured orthopedic back-supporting element, together with magnetic means secured thereto and cooperating with other magnetic means secured to the back of the said seat of the chair, the bench, the automobile seat, or the like, for adjustably positioning the orthopedic back-supporting element to suit the needs of the particular occupant.

Cross-reference to related applications

My application for patent is a companion of my co-pending application Ser. No. 558,719, filed June 20, 1966 and entitled Orthopedic Seat Support, and moreover, is a companion of my application Ser. No. 640,226, filed of even date herewith and entitled Back Support.

Background of the invention

As a matter of introduction, the present invention relates to a support for the back of an occupant of a chair, a bench, an automobile seat, or the like, for ready attachment to the seat of the same.

In order to gain a more ready understanding of the back support of my invention it may be noted at this point that it long has been recognized that prolonged sitting in a chair, or on a bench, or in an automobile, is frequently attended by discomfort in the back of the person using the same. Actually, it commonly is recognized that rapid tiring is encountered in sitting, not only in the office or at home, but especially in riding in an automobile, bus, or the like, for prolonged periods of time.

I find that the region of discomfort varies from person to person. Perhaps this is due to a difference in the physical structures of the persons, but in my view this discomfort derives from the particular configuration, construction and upholstery of the seat being used. A feeling of strain may develop in the thoracic region of some users, in the lumbar region of others, and in the sacral region of still others.

While efforts have been directed over the years to a solution of the problem noted, it does not appear that any one proposal really solves the problem. Some provide a seat that is suited to one user. Others provide a seat suited to another. But none seems to provide a universal seat, that is, one which with simple and ready adjustment is suited to all. Although proposals have been made for seats with adjustable backs, they appear to be either complicated in construction, uncertain in operation, unsightly in appearance, or of prohibitive cost.

Thus, for one reason or another, the known and available seats have not been found satisfactory in all respects, particularly for use over prolonged periods of time, especially by different users.

Summary of the invention

An object of the present invention, therefore, is to avoid in substantial measure the many defects and disadvantages of the seats of the prior art and at the same time to provide a simple, inexpensive, and effective back support for ready adaptation to known and available chairs, benches, automobile seats, and the like, which back support is light in weight, pleasing in appearance, and readily secured or adjusted in a direct and effective manner to closely satisfy the back support requirements of each individual user.

In broad concept, I provide a support for the back of an occupant of a chair, a bench, an automobile seat, or the like, this for adjustable attachment to the back of such seat, said support comprising a rigid and contoured orthopedic back-supporting element, together with a first magnetic means secured to the support element and a second magnetic means, cooperating with the first magnetic means, for securing to the back of the seat, all as more particularly described below.

Brief description of the drawings

In the several views of the drawings wherein I disclose an illustrative embodiment of my invention:

FIG. 1 is a side elevation of an office secretarial chair employing the back support of my invention;

FIG. 2 is a rear elevation of the support on enlarged scale, with certain parts broken away to disclose others;

FIGS. 3 and 4 are fragmentary rear elevations of alternate embodiments of the back support of my invention;

Throughout the several views of the drawings, it will be understood that like reference characters denote like structural parts.

Description of the preferred embodiments

Figure 5:
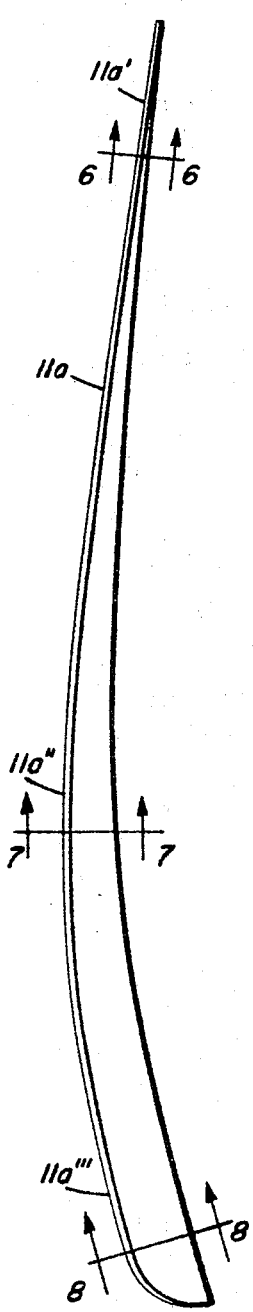
FIG. 5 is a side elevation on further enlarged scale of the orthopedic back-supporting element of my invention; while FIGS. 6, 7 and 8, respectively, are sectional views along the lines 6—6, 7—7 and 8—8 of FIG. 5 illustrating the curvature of the orthopedic back-supporting element.

Referring now more particularly to the practice of my invention and having especial reference to the several figures of the drawings, a conventional office secretary chair is shown at 10 in FIG. 1, this having a seat 10a, supporting legs and stand 10b, with back 10c supported by vertical standard 10d. The back support, generally shown at 11, comprises the orthopedic element 11a and the means 12–13 of securing the same to chair back 10c.

Figure 6:
Figure 7:
Figure 8:

Orthopedic back support 11a, as more particularly noted in FIG. 5 of the drawings, is of a rigid and contoured construction. The orthopedic support comprises an upper portion $11a^1$ for dorsal support (see also FIG. 6) of slight concave contour. Additionally, it comprises a lower mid-portion $11a^{11}$ for lumbar support (here see FIG. 7), this being of somewhat greater concavity than the upper portion. And the orthopedic support includes a lower portion $11a^{111}$ for support of the sacral area, this being of even greater concavity (see FIG. 8). The rigid and contoured orthopedic back support element 11a, for a best combination of results, is fashioned of aluminum alloy sheet of substantial thickness, that is, of sufficient thickness to prevent bending, denting or other distortion in actual use. Certain advantages, however, nevertheless are had where the orthopedic back support element is fashioned of molded plastic, plywood, hard rubber, or even sheet steel. In some respects additional advantages are had where it is sheet steel that is employed, all as more particularly noted hereinafter.

While the total height of the contoured orthopedic support element 11 may be made dependent upon the particular application, I find that a total height of some 18″ to 21″ gives best results. The width of the orthopedic element generally is on the order of 9″ to 11″, with a concavity or depression of about ½″ in the region of the dorsal area (area $11a^1$ of FIGS. 5 and 6), about 1″ concavity in the region of the lumbar area ($11a^{11}$ of FIGS. 5 and 7), and about 1½″ concavity in the region of the sacral area ($11a^{111}$ of FIGS. 5 and 8).

Now the rigid, contoured orthopedic back support element 11a of my invention is secured to the back 10c of chair 10 (see FIG. 1) by way of means 12–13. For best results I employ (see FIG. 2) parallel strips of magnetic tape 12a and 12b, which conveniently are secured to the back of the orthopedic supporting element 11a respectively by way of parallel pressure sensitive strips 13a and 13b (see FIGS. 9 and 10). The pressure sensitive strips are of a yieldable fabric with adhesive outer surfaces, the one surface securing to orthopedic support element 11a and the opposite surface securing to magnetic tape 12a (see FIGS. 9 and 10).

The cooperating magnetic tapes $12a^1$ and $12b^1$, that is, the magnetic tapes cooperating with tapes 12a and 12b, are secured to chair back 10c by way of pressure sensitive strips $13a^1$ and $13b^1$, one surface of each adhesively securing to the chair back itself and the other surface of each securing to the magnetic tapes.

Figure 9:
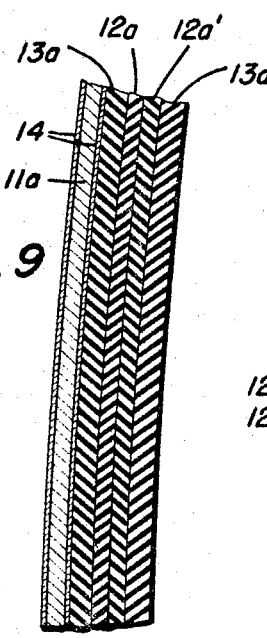
FIGS. 9 and 10, respectively, are a vertical section along the line 9—9 of FIG. 2 and a lateral section along the line 10—10 of FIG. 2 illustrating certain further features of the invention.
Figure 10:
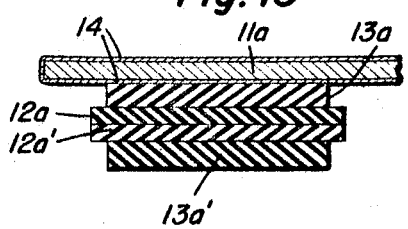

Actually, for maximum comfort the rigid contoured orthopedic back support element 11a is covered with a stretch nylon fabric (not shown in FIGS. 1, 5, 6, 7 and 8 but shown in FIGS. 9 and 10 at 14).

While the back support of my invention preferably contemplates two parallel strips of magnetic tape means 12 (see FIG. 2) securing the rigid contoured orthopedic back support 11a to a suitable chair back by way of pressure sensitive strips 13, it will be understood that where desired I employ (see FIG. 3) a single magnetic tape 120a secured to the rigid contoured orthopedic back support 110a by way of pressure sensitive strip 130a. Such single magnetic tape cooperates with a single magnetic tape $120a^1$ secured to the chair back by pressure strip $130a^1$.

Similarly, where desired I employ (see FIG. 4) three parallel strips of magnetic tape 121a, 121b and 121c, respectively secured to orthopedic back support 111a by pressure sensitive strips 131a, 131b and 131c with corresponding cooperating tapes secured to the chair back by way of pressure sensitive strips.

The back support of my invention is readily adjustable to suit the size of the particular person then using the seat with which it is associated by simply pulling the orthopedic back support element forwardly and away from the chair back, that is, separating the cooperating magnetic tapes, and then reuniting the tapes at desired position, either higher or lower. With the reuniting of the cooperating magnetic tapes the rigid contoured orthopedic back support element is firmly held with respect to the back of the chair or seat at desired position. And even with the vibration, shock or jogging encountered in vehicle travel, the orthopedic supporting element is retained without slippage or maladjustment.

Thus, in conclusion, it will be seen that I provide in my invention a back support for adjustable attachment to the back of a seat of a chair, a bench, an automobile seat, or the like, in which the various objects hereinbefore set forth, together with many thoroughly practical advantages are successfully had. With the back support of my invention there is achieved excellent support for the dorsal, the lumbar, and the sacral areas of the back of the user, all at minimum expense and with ease of adjustment and satisfying use. Precise adjustment is had with little effort. And comfort over periods of prolonged use is attained.

Since various embodiments of my invention very well may occur to those skilled in the art to which the invention relates, and inasmuch as numerous variations may be made in the several embodiments disclosed herein, it will be understood that all matter described herein is to be taken as merely illustrative and not as a limitation.

I claim:

1. A back support of adjustable attachment to the existing upright back rest of a seat for vertical positioning of the support at the selection of the user, such support comprising a rigid, contoured orthopedic back support element including concavely contoured portions for supporting the back of the user; first vertically extending spaced parallel magnetic tape means; corresponding vertically extending spaced parallel pressure sensitive strip means securing said first magnetic tape means to said orthopedic back support element; second vertically extending spaced parallel magnetic tape means cooperating with said first spaced parallel magnetic tape means; and second corresponding vertically extending spaced parallel pressure sensitive strip means for securing said second magnetic tape means to said upright back rest of said seat, whereby the orthopedic back support element is firmly held at desired position without slippage or maladjustment.

References Cited

UNITED STATES PATENTS

| | | | |
|---|---|---|---|
| 2,060,298 | 11/1936 | Gailey | 297—284 |
| 1,567,695 | 12/1925 | Angell | 297—460 |
| 2,807,313 | 9/1957 | Kaufman | 297—231 |
| 3,104,914 | 9/1963 | Burton | 297—391 |
| 3,209,729 | 10/1965 | Zedaker. | |
| 3,230,653 | 1/1966 | Rice. | |
| 3,314,634 | 4/1967 | Carter | 248—206 |
| 3,317,244 | 5/1967 | Ferro | 297—410 |
| 3,326,602 | 6/1967 | Moore et al. | 297—353 |
| 3,350,045 | 10/1967 | Mayers. | |

FRANCIS K. ZUGEL, Primary Examiner

U.S. Cl. X.R.

248—206; 297—353